(12) United States Patent
Shih et al.

(10) Patent No.: US 10,936,025 B2
(45) Date of Patent: Mar. 2, 2021

(54) FIXING BRACKET FOR THE INSTALLION OF COMPUTER EXPANSION CARD

(71) Applicant: HONGFUJIN PRECISION ELECTRONICS(TIANJIN)CO., LTD., Tianjin (CN)

(72) Inventors: Tung-Ho Shih, New Taipei (TW); Ying-Hui Shih, New Taipei (TW); Ting-Ya Liao, New Taipei (TW)

(73) Assignee: HONGFUJIN PRECISION ELECTRONICS (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 16/525,911

(22) Filed: Jul. 30, 2019

(65) Prior Publication Data
US 2020/0319684 A1    Oct. 8, 2020

(30) Foreign Application Priority Data
Apr. 8, 2019  (CN) .......................... 201910276942.5

(51) Int. Cl.
*G06F 1/18*        (2006.01)
*G11B 33/00*       (2006.01)

(52) U.S. Cl.
CPC ............ *G06F 1/187* (2013.01); *G11B 33/005* (2013.01)

(58) Field of Classification Search
CPC ...................................................... G06F 1/187
USPC ................................................... 361/679.33
See application file for complete search history.

(56) References Cited

U.S. PATENT DOCUMENTS

| 6,141,222 | A  | * | 10/2000 | Toor ....................... G06F 1/184 312/223.1 |
| 6,775,132 | B2 | * | 8/2004  | Chen ....................... G06F 1/184 312/223.1 |
| 7,016,190 | B1 | * | 3/2006  | Chang ..................... G06F 1/184 235/381 |
| 7,070,323 | B2 | * | 7/2006  | Wanek ............... G01R 31/2849 324/750.08 |
| 7,609,511 | B2 | * | 10/2009 | Peng .................... G11B 33/128 248/633 |
| 7,782,603 | B2 | * | 8/2010  | Curnalia .............. G11B 33/122 361/679.33 |
| 7,903,401 | B2 | * | 3/2011  | Lee ........................ G06F 1/187 361/679.33 |
| 8,226,050 | B2 | * | 7/2012  | Ye ........................ G11B 33/124 248/27.3 |
| 8,320,118 | B2 | * | 11/2012 | Chuang ................ G11B 33/124 361/679.33 |
| 8,351,197 | B2 | * | 1/2013  | Lo .......................... G11B 33/08 361/679.34 |
| 8,913,377 | B2 | * | 12/2014 | Furuta .................. H05K 7/1489 361/679.33 |

(Continued)

*Primary Examiner* — Adrian S Wilson
(74) *Attorney, Agent, or Firm* — ScienBiziP, P.C.

(57) ABSTRACT

A fixing bracket for holding an expansion card in a computer without screws includes first and second fixing frames and an elastic member connected to the first and second fixing frames. The two fixing frames define a receiving space for the expansion card. The first fixing frame can be moved relative to the second fixing frame, or the second fixing frame can be moved relative to the first fixing frame, by applying an external force to deform the elastic member. When the external force is released, the elastic member restores and clamps the expansion card in place until disassembly by the same process.

18 Claims, 10 Drawing Sheets

(56) References Cited

U.S. PATENT DOCUMENTS

| | | | |
|---|---|---|---|
| 9,330,730 B2* | 5/2016 | Makley | G11B 33/08 |
| 9,733,678 B2* | 8/2017 | Chen | G06F 1/187 |
| 9,746,887 B2* | 8/2017 | Lai | G11B 33/124 |
| 2003/0099094 A1* | 5/2003 | Coles | H05K 7/20172 |
| | | | 361/726 |
| 2004/0022034 A1* | 2/2004 | Coles | H05K 7/20172 |
| | | | 361/726 |
| 2004/0184231 A1* | 9/2004 | Chen | G06F 1/187 |
| | | | 361/679.33 |
| 2005/0063151 A1* | 3/2005 | Dean | G06F 1/187 |
| | | | 361/679.33 |
| 2006/0012952 A1* | 1/2006 | Chang | G06F 1/184 |
| | | | 361/679.33 |
| 2006/0023413 A1* | 2/2006 | Lo | G06F 1/187 |
| | | | 361/679.02 |
| 2008/0158810 A1* | 7/2008 | Liu | G11B 33/124 |
| | | | 361/679.33 |
| 2009/0103252 A1* | 4/2009 | Peng | G11B 33/124 |
| | | | 361/679.4 |
| 2011/0234064 A1* | 9/2011 | Makley | G11B 33/128 |
| | | | 312/236 |
| 2012/0160979 A1* | 6/2012 | Ye | G11B 33/124 |
| | | | 248/316.7 |
| 2012/0212898 A1* | 8/2012 | Lo | G11B 33/08 |
| | | | 361/679.33 |
| 2013/0099640 A1* | 4/2013 | Hu | G06F 1/187 |
| | | | 312/223.2 |

* cited by examiner

FIXING BRACKET FOR THE INSTALLION OF COMPUTER EXPANSION CARD

FIELD

The subject matter herein generally relates to computer fixings.

BACKGROUND

Expansion cards are generally fixed to brackets in computer chassis through screws. Thus, a screwdriver is needed to fix the expansion card in the computer chassis, which is inconvenient to assemble and disassemble the expansion card.

Therefore, there is room for improvement within the art.

BRIEF DESCRIPTION OF THE DRAWINGS

Implementations of the present technology will now be described, by way of embodiments with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to show details and features of the present disclosure better. The disclosure is by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

Figure 1:
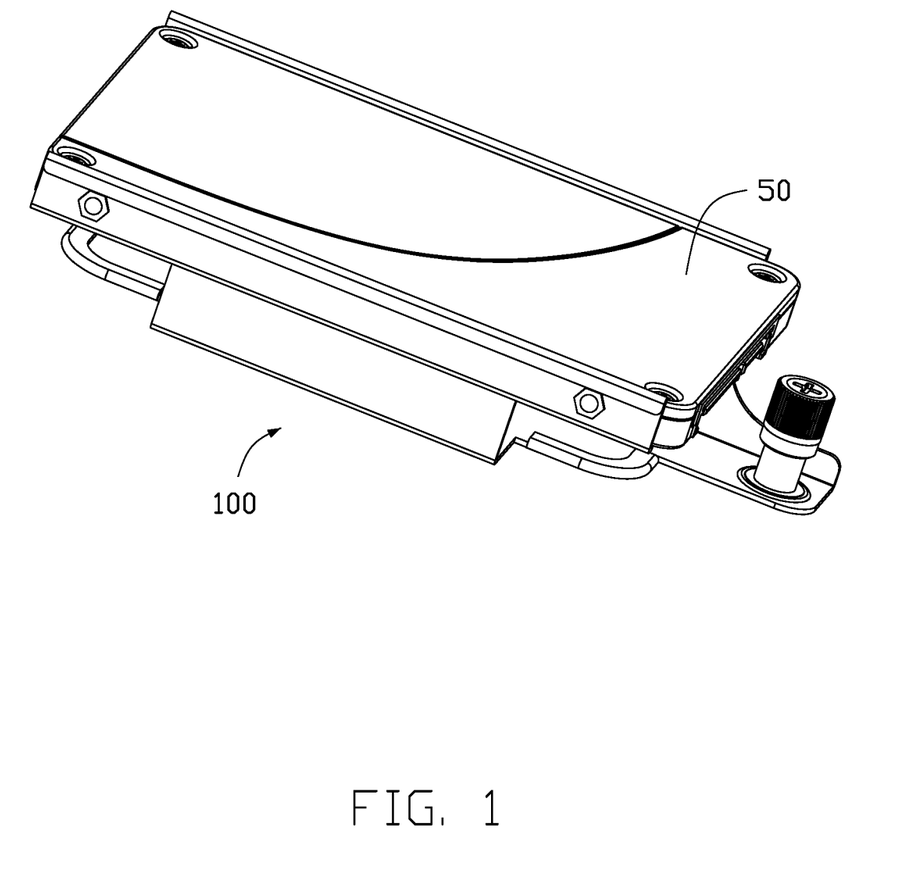
FIG. 1 is an isometric view of a fixing bracket holding an expansion card according to a first embodiment.

Referring to FIG. 1, in the embodiment, a computer chassis (not shown) is provided. The chassis includes a chassis body (not shown) and a fixing bracket 100 in the chassis body. The fixing bracket 100 is configured to hold and secure a working expansion card.

Figure 2:
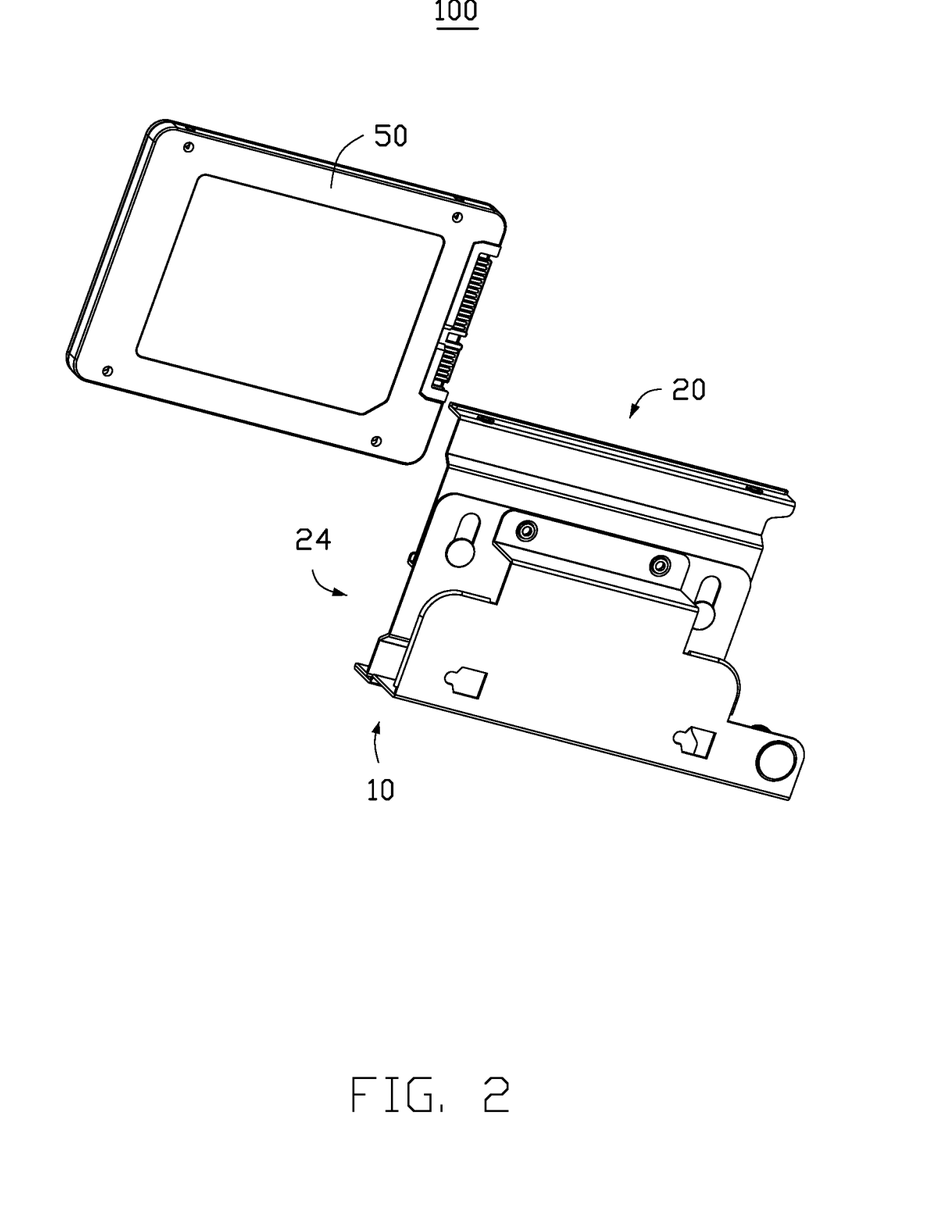
FIG. 2 is an exploded view of the fixing bracket in FIG. 1.
Figure 3:
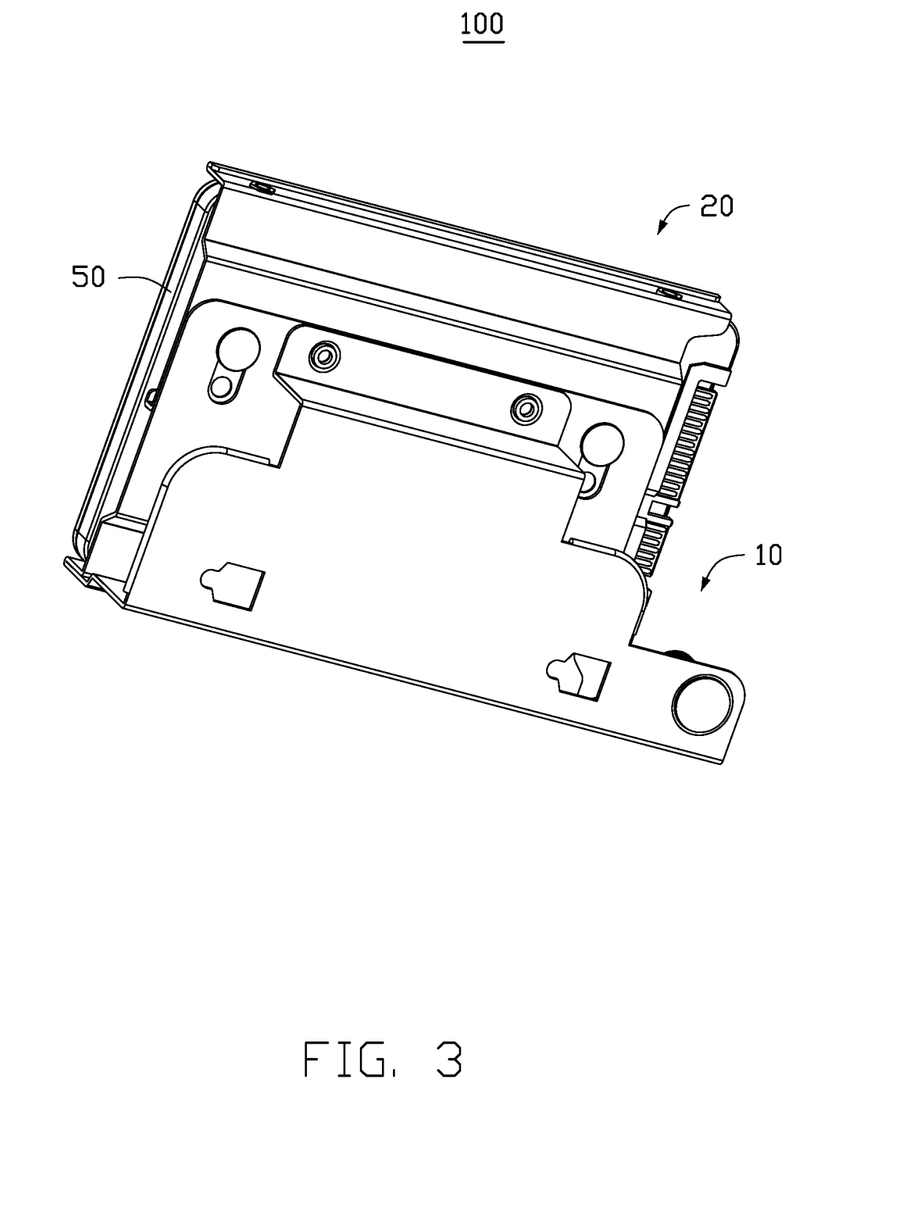
FIG. 3 is similar to FIG. 1, but viewed from a different viewpoint.
Figure 4:
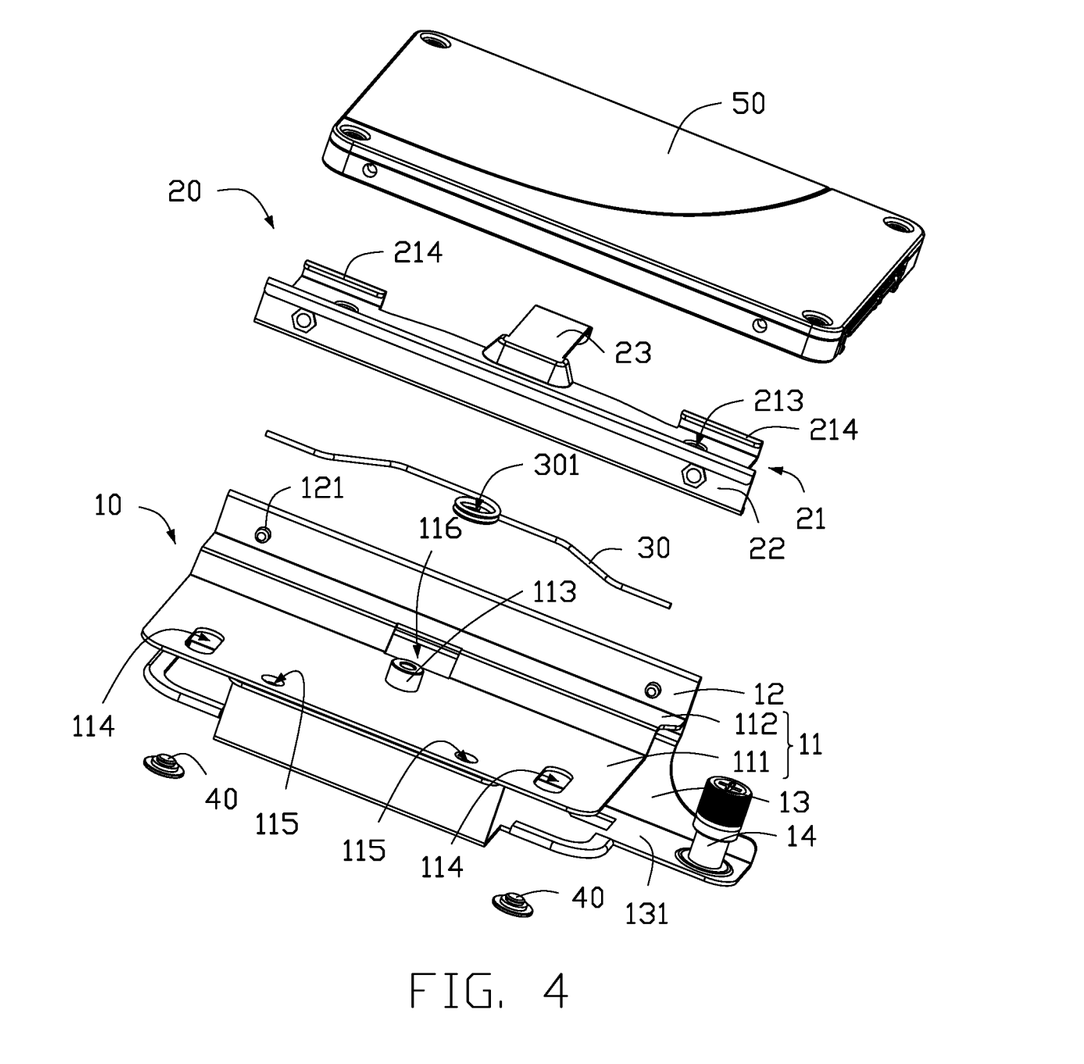
FIG. 4 is another exploded view of the fixing bracket in FIG. 2.

Referring to FIG. 1, FIG. 2, and FIG. 4, the fixing bracket 100 includes a first fixing frame 10, a second fixing frame 20, and an elastic member 30. The second fixing frame 20 is movably coupled to the first fixing frame 10. The first fixing frame 10 and the second fixing frame 20 together form a receiving space 24 for receiving the expansion card. The elastic member 30 is connected to the first fixing frame 10 and the second fixing frame 20.

The elastic member 30 is deformed when an external force is applied to the fixing bracket 100, to move the first fixing frame 10 relative to the second fixing frame 20 or the second fixing frame 20 relative to the first fixing frame 10. When the external force on the fixing bracket 100 is released, the elastic member 30 is restored and the first fixing frame 10 or the second frame 20 is returned by a restoring force of the elastic member.

In the embodiment, the expansion card is a hard disk 50. It can be understood that in other embodiments, the expansion card can be other component.

Referring to FIG. 4, in other embodiments, the fixing bracket 100 further includes two fasteners 40. The first frame 10 is attached to the second frame 20 by the fasteners 40. In other embodiments, the fastener 40 can be replaced with a post extending from the first frame 10, the first frame 10 would be attached to the second frame 20 by the post.

Figure 5:
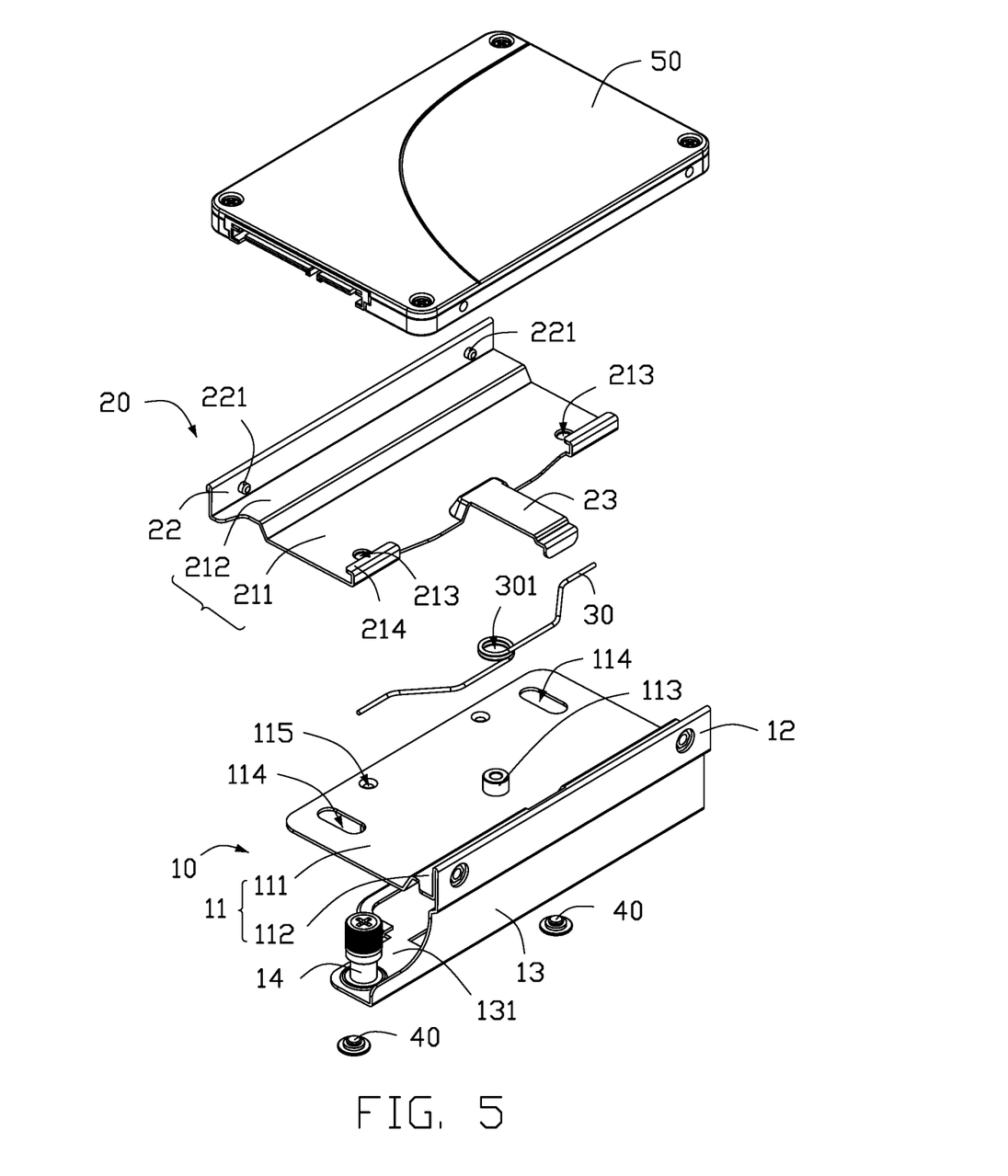
FIG. 5 is similar to FIG. 4, but viewed from a different viewpoint.
Figure 6:
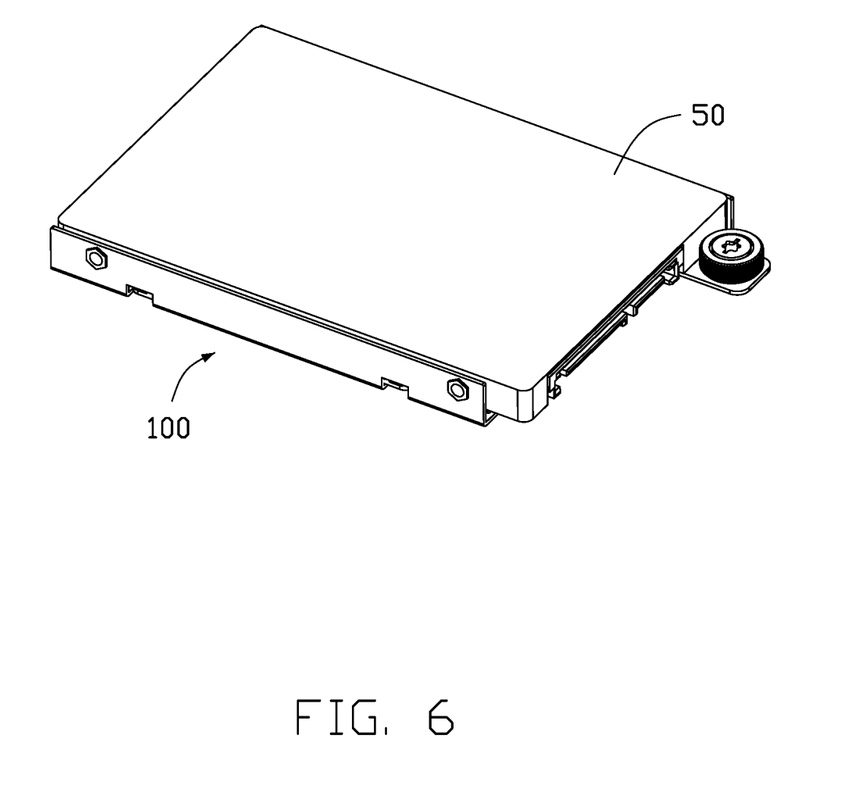
FIG. 6 is an isometric view of a fixing bracket holding an expansion card according to a second embodiment.
Figure 7:
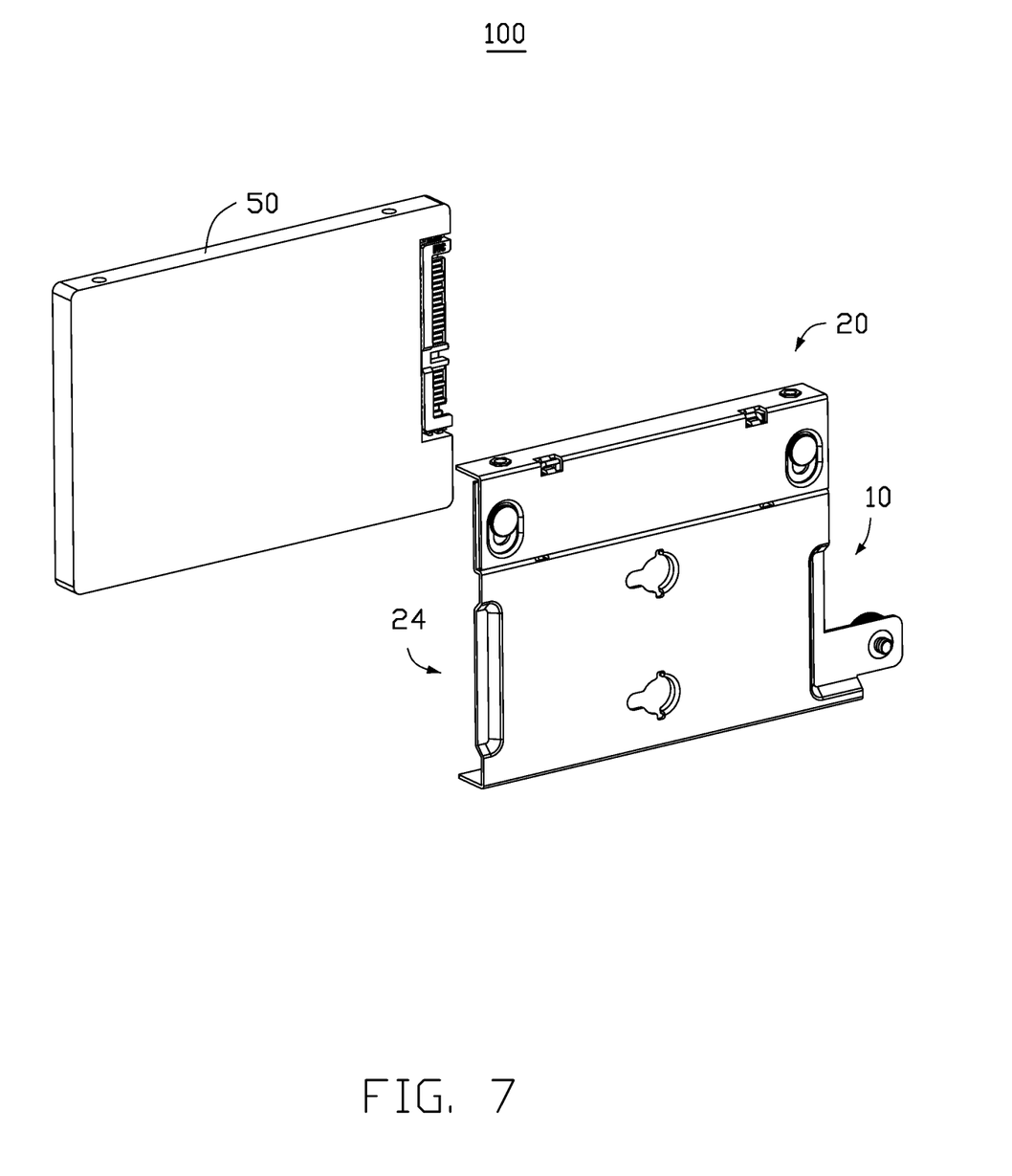
FIG. 7 is an exploded view of the fixing bracket in FIG. 6.
Figure 8:
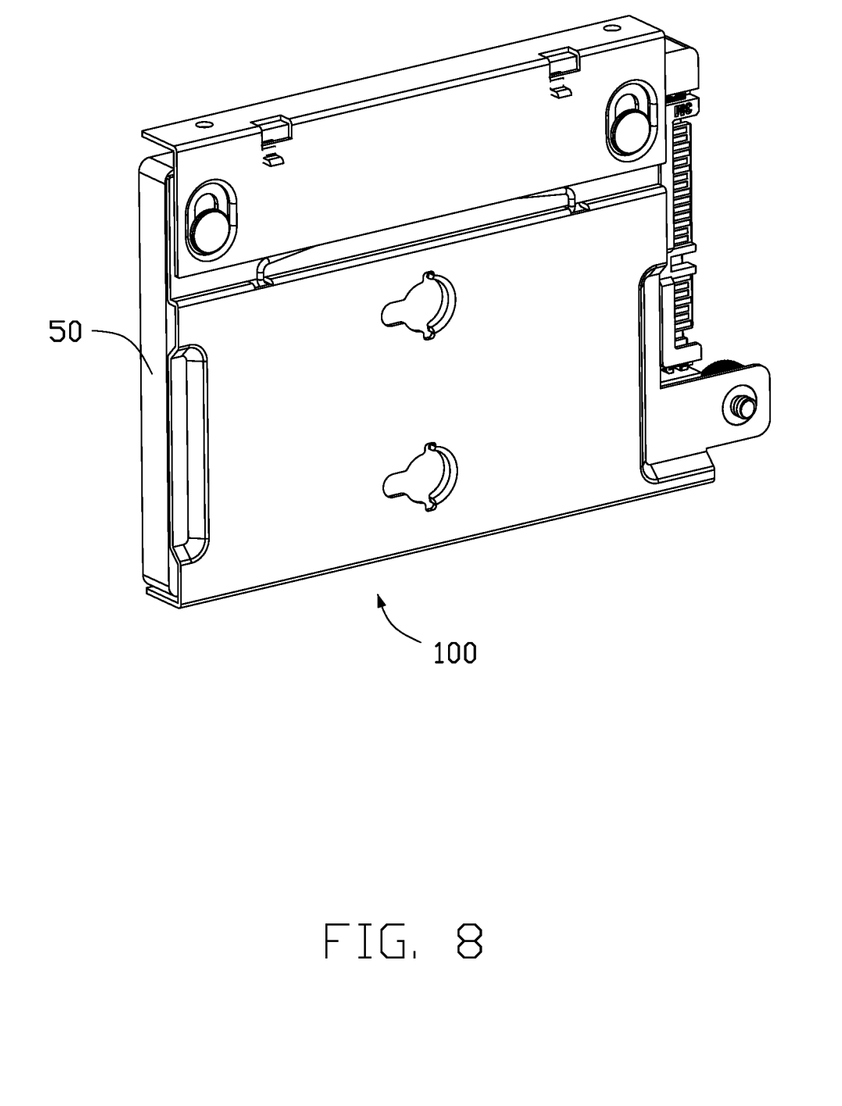
FIG. 8 is similar to FIG. 6, but with a second frame sliding on a first frame.

Referring to FIGS. 4 and 5, the first frame 10 includes a first bottom plate 11 and a first side plate 12. The first side plate 12 protrudes substantially perpendicularly from the first bottom plate 11.

In other embodiments, the first fixing frame 10 further includes a fixing plate 13 and a post 14 positioned on the fixing plate 13. The fixing plate 13 is positioned at a lower end of the first bottom portion 111. The two ends of the fixing plate 13 are connected to the first bottom plate 11 and the first side plate 12. The post 14 is configured to fix the first frame 10 within the chassis.

Referring to FIG. 4, in the embodiment, the first bottom plate 11 includes a first bottom portion 111 and a first connecting portion 112 connected to the first bottom portion 111. The first connecting portion 112 is curved. The first bottom portion 111 and the first side plate 12 are connected to the left and right sides of the first connecting portion 112. The first bottom portion 111 and the first connecting portion 112 are not in the same plane, the first connecting portion 112 is located on the right side of the first bottom portion 111. A boss 113 extends upwardly from the first bottom portion 111. The elastic member 30 is coupled to the boss 113. The first bottom portion 111 defines two first sliding slots 114 on a side away from the first connecting portion 112. The two first sliding slots 114 are adjacent to the front and rear ends of the first bottom portion 111. When the second fixing frame 20 moves on the first fixing frame 10, the second fixing frame 20 drives the fastener 40 to move along the first sliding slot 114. The first bottom portion 111 further defines a first through hole 115 between the two first sliding slots 114. A screw (not shown) or other fixing member passes through the first through hole 115 to fix the fixing plate 13 to the first bottom portion 111. The first connecting portion 112 defines a second through hole 116 on a side opposite to the first bottom portion 111.

Referring to FIG. 4, at least one protruding rod 121, substantially parallel to the first bottom portion 111, protrudes from an inner side of the first side plate 12. The protruding rod 121 is configured to abut the hard disk 50. In the embodiment, the first side plate 12 includes two protruding rods 121, the number of the protruding rods 121 not being limited.

Referring to FIG. 4, a fixing portion 131 extends from an end of the fixing plate 13, and the post 14 is fixed at the fixing portion 131. The fixing bracket 100 is fixed in the chassis by the post 14.

In the embodiment, the first bottom plate 11, the first side plate 12, and the fixing plate 13 are integrally formed. In other embodiments, the first fixing frame 10 can be fixed in the chassis by other means, such as fixing the chassis on the first bottom plate 11 or the first side plate 12 by screws.

Referring to FIG. 4, the second fixing frame 20 includes a second bottom plate 21 and a second side plate 22 protruding substantially perpendicularly from the second bottom plate 21.

The second fixing frame 20 further includes a hook 23. The hook 23 is positioned on the second bottom plate 21 and opposite to the second side plate 22. The hook 23 extends toward the first connecting portion 112 to be received in the second through hole 116. When the second fixing frame 20 moves from a first position to a second position on the first fixing frame 10, that is, the second fixing frame 20 moves away from the first fixing frame 10, the hook 23 locks to the first bottom portion 111 and prevents the second fixing frame 20 disengaging from the first fixing frame 10. When the second frame 20 is reset from the second position to the first position on the first fixing frame 10, the hook 23 is disengaged from the first bottom portion 111.

Referring to FIG. 4 and FIG. 5, in the embodiment, the second bottom plate 21 includes a second bottom portion 211 and a second connecting portion 212 connected to the second bottom portion 211. The second connecting portion 212 is substantially curved. The second bottom portion 211 and the second connecting portion 22 are connected to the two sides of the second connecting portion 212. The second connecting portion 212 and the second bottom portion 211 are not in the same plane. The hook 23 is positioned on a side of the second bottom portion 211 away from the second side plate 22. The second bottom portion 211 defines a fixing hole 213. The fastener 40 passes through the first sliding slot 114 and fixing hole 213 to fix the first fixing frame 10 to the second fixing frame 20. The second bottom portion 211 includes a resisting portion 214 on the same side of the hook portion 23. The resisting portion 214 is bent toward the second connecting portion 212. The end of the elastic member 30 abuts against the resisting portion 214 to provide a restoring force to the second fixing frame 20.

Referring to FIG. 5, two protruding columns 221 protrude from an inner side of the second side plate 22. The protruding columns 221 are substantially parallel to the second bottom portion 211. The protruding columns 221 cooperate with the protruding rod 121 to clamp the hard disk 50. In the embodiment, the first bottom portion 111 and the second bottom portion 211 partially overlap. The fastener 40 is positioned at an overlapped portion of the first bottom portion 111 and the second bottom portion 211.

Referring to FIG. 4, in the embodiment, the elastic member 30 is a torsion spring. The elastic member 30 defines a card hole 301 at the middle of the elastic member 30. The elastic member 30 is sleeved on the boss 113. The two ends of the elastic member 30 abut against the resisting portion 214 to provide the restoring force to the second fixing frame 20.

Referring to FIG. 1 to FIG. 5, before the hard disk 50 is assembled to the fixing bracket 100, the second fixing frame 20 is closer to the first fixing frame 10, and the hook 23 is not buckled on the first bottom portion 111. The elastic member 30 is not deformed. To assemble the hard disk 50 to the fixing bracket 100, an external force is applied to the second fixing frame 20 to move the fastener 40 from the first position to the second position and deform the elastic member 30. When the external force is released, the elastic member 30 resets the second fixing frame 20 from the second position to the first position. The protruding rod 121 and the protruding column 221 thereby extend to the hard disk 50, and the hard disk 50 is thus fixed to the fixing bracket 100.

To disassemble the hard disk 50 from the card fixing bracket 100, an external force is applied to the second fixing frame 20 to move the fastener 40 from the first position to the second position. The hard disk 50 can then be taken out from the fixing bracket 100, and the second fixing frame 20 is reset by the restoring force of the elastic member 30.

Figure 9:
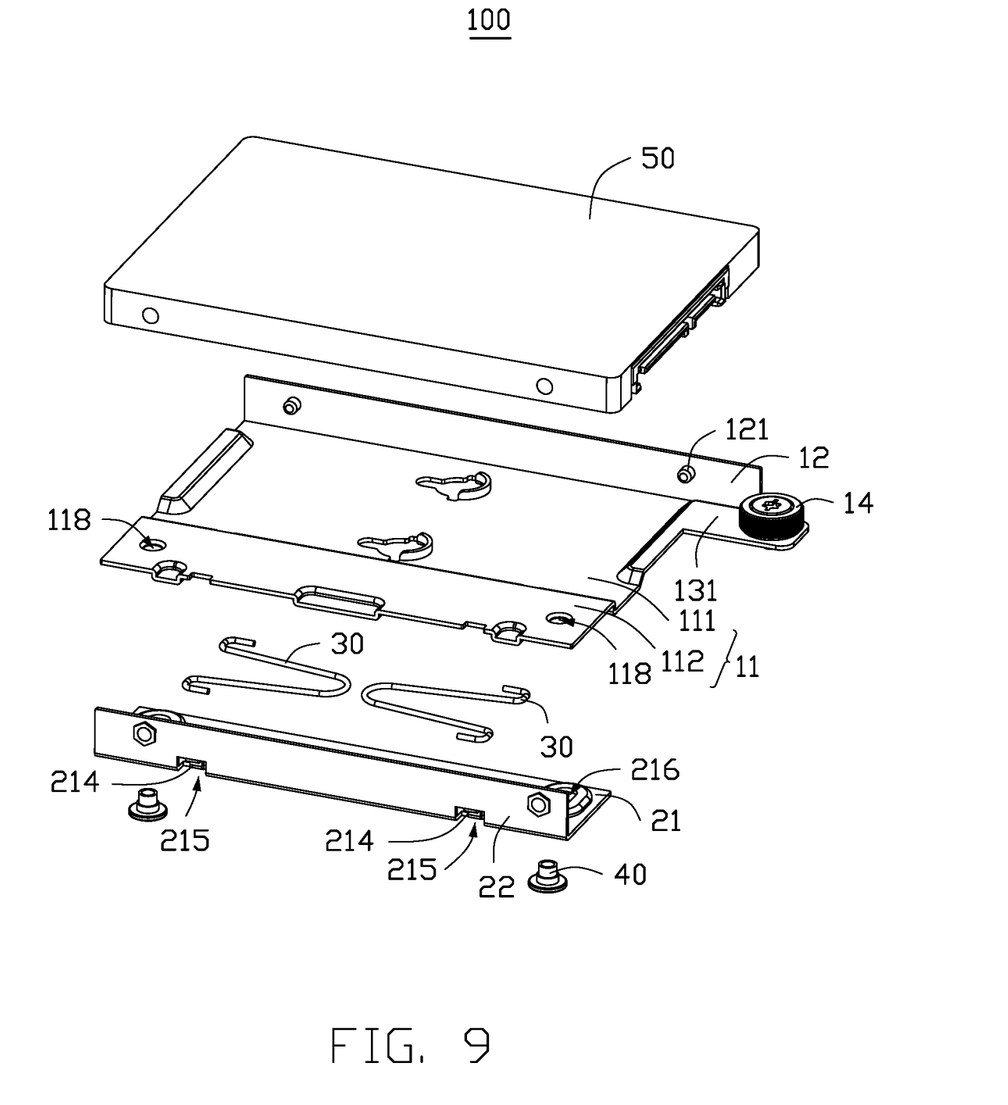
FIG. 9 is a another exploded view of the fixing bracket in FIG. 7.
Figure 10:
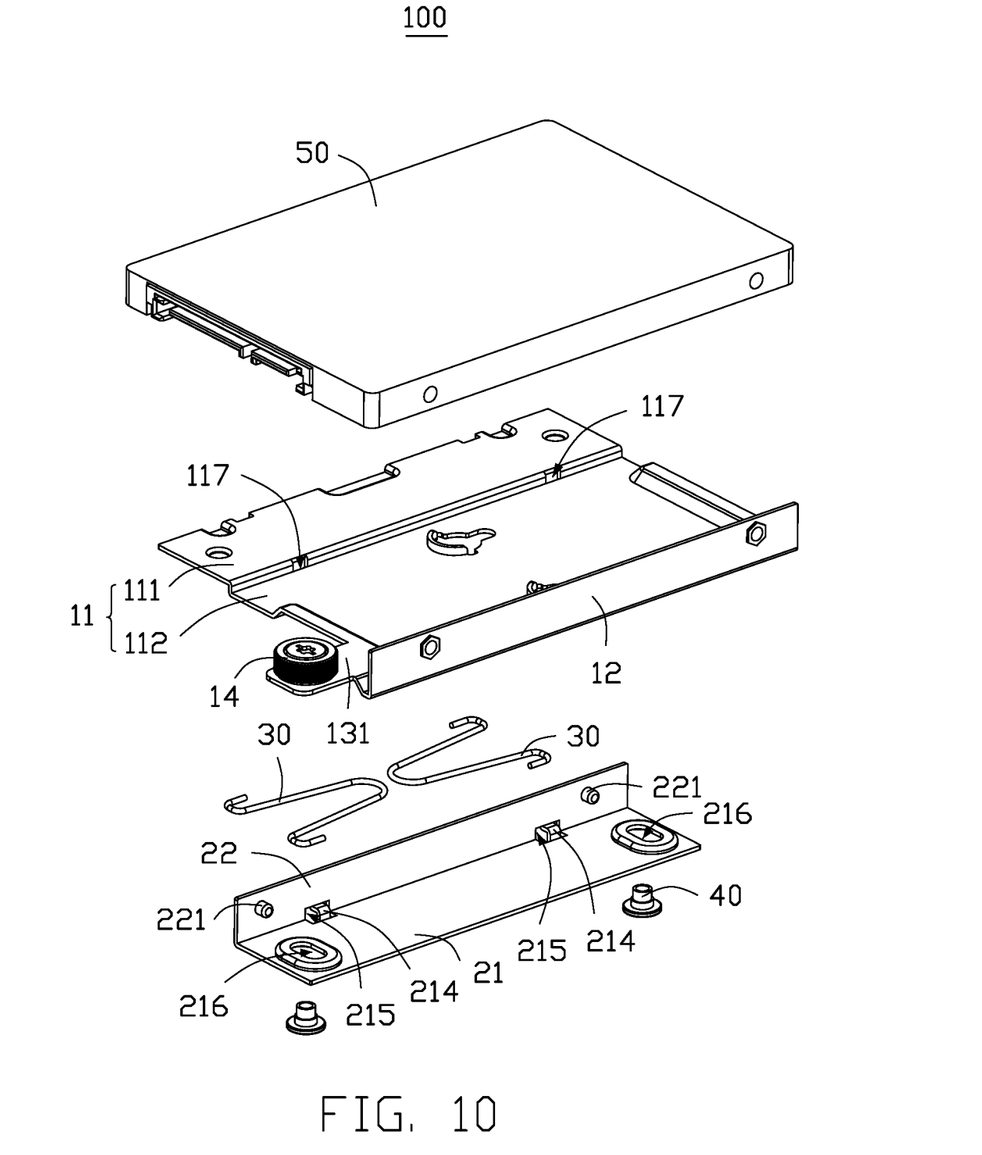
FIG. 10 is similar to FIG. 9, but viewed from a different viewpoint.

Referring to FIGS. 9 and 10, the structure of the second embodiment is substantially identical to that of the first embodiment. The second embodiment is different from the first embodiment in that the first bottom portion 111 does not include the boss 113, and the second bottom plate 21 does not include the hook 23.

Specifically, in the second embodiment, the first connecting portion 112 and the first side plate 12 are positioned on opposite sides of the first bottom plate 11. The first connecting portion 112 defines two fastening holes 118. A third through hole 117 is defined in a connection portion between the first connecting portion 112 and the first bottom portion 111. The fixing portion 131 is directly positioned at one end of the first bottom portion 111. The second bottom plate 21 does not include the second bottom portion (not shown) and the second connecting portion (not shown). The second bottom plate 21 is directly connected, substantially perpendicularly, to the second side plate 22. A fourth through hole 215 is defined in a connection portion between the second bottom plate 21 and the second side plate 22. The resisting portion 214 is positioned at the fourth through hole 215.

Referring to FIG. 9 and FIG. 10, in the embodiment, the elastic member 30 includes a first elastic arm (not labeled) and a second elastic arm (not labeled) connected to the first elastic arm. The first and second elastic arms are substantially V-shaped. The first elastic arm and the second elastic arm are respectively attached to the first fixed frame 10 and the second fixing frame 20. The first elastic arm passes through the third through hole 117 and abuts against the first connecting portion 112. The second elastic arm passes through the fourth through hole 215 and abuts against the resisting portion 214. The two ends of the second bottom plate 21 define a second sliding slot 216. The fastener 40 passes through the second sliding slot 216 and the fastening hole 118 to connect the first connecting portion 112 to the second bottom plate 21. It can be understood that, in other embodiments, the shape of the elastic member 30 is not limited thereto.

In the embodiment, the fixing bracket 100 includes two elastic members 30. The two elastic members 30 are opposite to each other and positioned between the first connecting portion 112 and the second bottom plate 21. The first connecting portion 112 and the second bottom plate 21 are substantially overlapped. If a single elastic member 30 can provide sufficient restoring force to the second fixing frame 20, in other embodiments, only one elastic member 30 is needed.

Referring to FIG. 6 to FIG. 10, the assembly and disassembly processes of the hard disk 50 to or from the fixing bracket 100 in the second embodiment are consistent with those in the first embodiment.

To fix and hold the hard disk 50 in place, the fixing bracket 100 drives the second fixing frame 20 to move on the first fixing frame 10 through the elastic member 30. It is not necessary to use screws or other fixing accessories to fix the hard disk 50, this improves efficiency during assembly and reduces the cost.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A fixing bracket for fixing an expansion card comprising:
    a first fixing frame;
    a second fixing frame movably connected to the first fixing frame;
    an elastic member connected to the first fixing frame and the second fixing frame;
    wherein the second fixing frame and the first fixing frame defines a receiving space configured for receiving the expansion card, when an external force is applied on the fixing bracket, the first fixing frame moves relative to the second fixing frame or the second fixing frame move relative to the first fixing frame and the elastic member is deformed, when the external force on the fixing bracket is released, the elastic member rebounds to retract the first fixing frame or the second frame, the fixing bracket further comprises a boss extending upwardly from the first fixing frame, the elastic member being coupled to the boss.

2. The fixing bracket of claim 1, wherein the elastic member is a torsion spring, the elastic member defines a card hole at the middle of the elastic member, the elastic member is sleeved on the boss, two ends of the elastic member abut against the second fixing frame.

3. The fixing bracket of claim 1, wherein the fixing bracket further comprises at least one fastener, the first frame is attached to the second frame by the fastener, the first fixing frame defines at least one first sliding slot, when the second fixing frame moves on the first fixing frame, the second fixing frame drives the fastener to move along the first sliding slot.

4. The fixing bracket of claim 3, wherein the second fixing frame comprises a hook, when the second fixing frame moves from a first position to a second position on the first fixing frame, the hook locks to the first fixing frame.

5. The fixing bracket of claim 4, wherein the elastic member comprises a first elastic arm and a second elastic arm connected to the first elastic arm, the first elastic arm and the second elastic arm are attached to the first fixed frame and the second fixing frame.

6. The fixing bracket of claim 5, wherein the fixing bracket further comprises at least one fastener, the first frame is attached to the second frame by the fastener, the second fixing frame defines at least one second sliding slot, when the second fixing frame moves on the first fixing frame, the second fixing frame drives the fastener to move along the second sliding slot.

7. The fixing bracket of claim 1, wherein the first frame comprises a first bottom plate and a first side plate, the first side plate is perpendicularly protruding from the first bottom plate, the second fixing frame comprises a second bottom plate and a second side plate protruding from the second bottom plate, the first bottom plate and the second bottom plate are configured to carry the expansion card, the first side plate and the second side plate are configured to clamp the expansion card.

8. The fixing bracket of claim 7, wherein the at least one protruding rod protrudes from an inner side of the first side plate, at least one protruding columns protrudes from an inner side of the second side plate.

9. The fixing bracket of claim 1, wherein an end of the first fixing frame is extended with a fixing portion, the fixing bracket is fixed to a chassis by the fixing portion.

10. A fixing bracket for fixing an expansion card comprising:
    a first fixing frame;
    a second fixing frame slidably attached to the first fixing frame;
    an elastic member connected to the first fixing frame and the second fixing frame;
    wherein the second fixing frame and the first fixing frame defines a receiving space for receiving the expansion card, when an external force is applied on the fixing bracket, the first fixing frame moves relative to the second fixing frame or the second fixing frame move relative to the first fixing frame and the elastic member is deformed, when the external force on the fixing bracket is released, the elastic member rebounds to retract the first fixing frame or the second frame, the fixing bracket further comprises a boss extending upwardly from the first fixing frame, the elastic member being coupled to the boss.

11. The fixing bracket of claim 10, wherein the elastic member is a torsion spring, the elastic member defines a card hole at the middle of the elastic member, the elastic member is sleeved on the boss, the two ends of the elastic member abut against the second fixing frame.

12. The fixing bracket of claim 10, wherein the fixing bracket further comprises at least one fastener, the first frame is attached to the second frame by the fastener, the first fixing frame defines at least one first sliding slot, when the second fixing frame moves on the first fixing frame, the second fixing frame drives the fastener to move along the first sliding slot.

13. The fixing bracket of claim 12, wherein the second fixing frame comprises a hook, when the second fixing frame moves from a first position to a second position on the first fixing frame, the hook locks to the first fixing frame.

14. The fixing bracket of claim 13, wherein the elastic member comprises a first elastic arm and a second elastic arm connected to the first elastic arm, the first elastic arm and the second elastic arm are attached to the first fixed frame and the second fixing frame.

15. The fixing bracket of claim 14, wherein the fixing bracket further comprises at least one fastener, the first frame is attached to the second frame by the fastener, the second fixing frame defines at least one second sliding slot, when the second fixing frame moves on the first fixing frame, the second fixing frame drives the fastener to move along the second sliding slot.

16. The fixing bracket of claim 10, wherein the first frame comprises a first bottom plate and a first side plate, the first side plate is perpendicularly protruding from the first bottom plate, the second fixing frame comprises a second bottom plate and a second side plate protruding from the second bottom plate, the first bottom plate and the second bottom plate are configured to carry the expansion card, the first side plate and the second side plate are configured to clamp the expansion card.

17. The fixing bracket of claim 16, wherein the at least one protruding rod protrudes from an inner side of the first side plate, at least one protruding columns protrudes from an inner side of the second side plate.

18. The fixing bracket of claim 10, wherein an end of the first fixing frame is extended with a fixing portion, the fixing bracket is fixed to a chassis by the fixing portion.

\* \* \* \* \*